J. F. VOORHEES.
Attachment for Mowers and Reapers.

No. 242,570. Patented June 7, 1881.

WITNESSES:
Chas. Nida.
C. Sedgwick.

INVENTOR:
J. F. Voorhees
BY Munn & Co
ATTORNEYS.

UNITED STATES PATENT OFFICE.

JEREMIAH F. VOORHEES, OF MIDDLEBUSH, NEW JERSEY.

ATTACHMENT FOR MOWERS AND REAPERS.

SPECIFICATION forming part of Letters Patent No. 242,570, dated June 7, 1881.

Application filed January 30, 1880.

*To all whom it may concern:*

Be it known that I, JEREMIAH F. VOORHEES, of Middlebush, in the county of Somerset and State of New Jersey, have invented a new Improvement in Attachments for Mowers and Reapers, of which the following is a specification.

Figure 1:
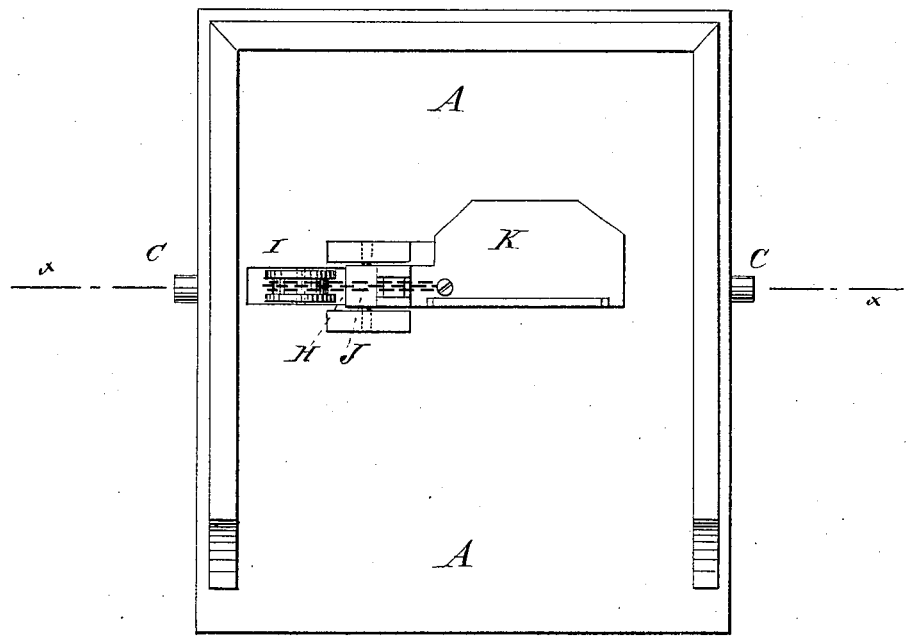
Figure 2:
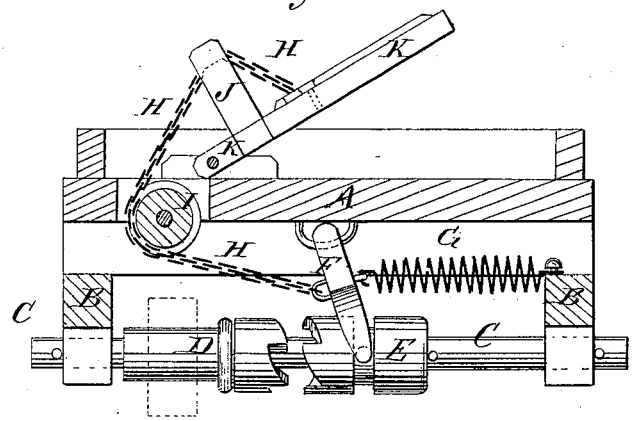

Figure 1 is a plan view of the improvement. Fig. 2 is a sectional elevation taken through the line $x\ x$, Fig. 1.

Similar letters of reference indicate corresponding parts.

The object of this invention is to furnish attachments for mowers and reapers so constructed that the cutting mechanism will always be out of gear and at rest except when held in gear by the voluntary action of the driver, whereby the vibration of the cutters will be stopped when the driver is off the machine.

The invention consists in the combination, with the clutch and clutch-lever that connect the gearing and axle, of a spring, chain, pulley, and lever having a projecting arm, so that the driving mechanism will be held in gear by downward pressure upon the lever, and will be thrown out of gear when the pressure is removed, as will be hereinafter fully described.

A represents the platform, B the frame, and C the axle, of a reaper or mower.

D represents the hub of the gear-wheel, by means of which motion is given to the cutters from the axle C, and which runs loosely upon the said axle. Upon one end of the hub D are formed teeth to engage with the teeth of the clutch E, placed upon the axle C and connected with it by a tongue and groove, so that the clutch E will be carried around by and with the axle C, but can be moved longitudinally upon it to throw the clutch E into and out of gear with the hub D. The clutch E has a ring-groove formed in it to receive the forked end of the lever F, the other end of which is pivoted to the platform A or other support, as the construction of the machine may render most convenient.

To the clutch-lever F is attached one end of a spiral spring, G, the other end of which is attached to the frame B or other suitable support in such a position that the tension of the spring G will draw the clutch E out of gear with the hub D. To the other side of the lever F is attached the end of a chain, H, which passes over one or more guide-pulleys, I, over the end of the arm J, and its other end is attached to the foot-lever K. The foot-lever K is pivoted at one end to the platform A, or to other suitable support, and the end of the arm J is rigidly attached to it, between its end and the end of the chain H. The arm J is arranged at right angles, or nearly so, with the lever K, so that when the lever K is pressed down into a horizontal position the chain H is drawn over the arm J in such a direction that very little force will be required to hold the said lever down and the machinery in gear. With this construction, should the driver remove his feet from the lever K, the tension of the spring G will at once withdraw the clutch E from the hub D and throw the machinery out of gear, so that it will be impossible for the cutters to be vibrated by the advance of the machine except while the lever K is held down.

The chain H may be led over guide-pulley I in any desired direction, so that the lever K may be in front of the driver's seat, whatever be the construction of the machine and position of the seat.

I am aware that the seat of a harvester has been provided with a lever that when depressed by the weight of the person withdraws spring-dogs from the driving-wheels. When the lever is released the dogs act to hold the wheels and cause them to drag. In my improvement the driving-wheels are not acted upon, and may continue to revolve. The revolution of the crank that vibrates the cutter-bar is stopped by a device that acts automatically as soon as pressure is relieved from the foot-treadle. This not only prevents risk of injury by automatically stopping the vibrations of the cutter-bar if the driver is off the machine, but it enables him to stop and start the cutter-bar with his foot without rising from his seat while the machine is in motion. In some instances a platform has been used for the driver's feet to rest upon, the same being connected with the coupling mechanism, so that the cutter-bar will be thrown out of action when pressure is relieved from the platform. I have found in practice that unless the treadle or foot-lever can be kept in place with a small amount of pressure the attendant cannot keep the cutter-bar in gear, because the agitation of the machine in going over rough ground and the operating of other parts by the hands of the attendant is liable to lessen the pressure of the feet on the coupling-lever or treadle and it rises. This is particularly the case when the mower or reaper is operated by a young person. By my improvement the chain H, passing over the brace J to the foot-lever K, gives the necessary movement to the coupling device when the foot-lever K is depressed, and in the depressed position the chain draws up so closely to the fulcrum of the foot-lever K that the attendant has such a great leverage that the foot-lever is kept depressed with so little power that there is no exertion of force necessary by the feet and legs to keep the cutter-bar coupled to the driver-wheels.

I claim as my invention—

The combination, with the cutter-bar, actuating mechanism, and clutch, of the spring G, foot-lever K, brace J, chain H, and pulley I, arranged for operation as set forth, so that the chain H draws close to the fulcrum of the foot-lever K, when the same is depressed, for the purposes set forth.

JEREMIAH F. VOORHEES.

Witnesses:
F. V. L. VOORHEES,
C. V. M. VOORHEES.